J. B. BOWCOCK.
ICE CUTTING MACHINE.
APPLICATION FILED AUG. 21, 1911.
1,013,733.
Patented Jan. 2, 1912.
2 SHEETS—SHEET 2.
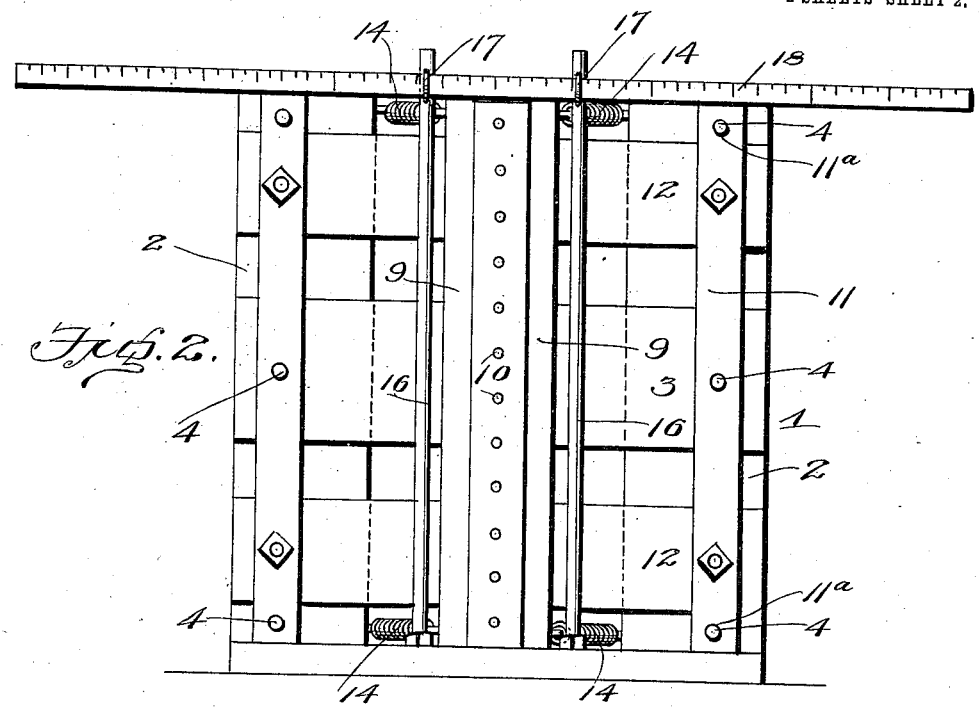
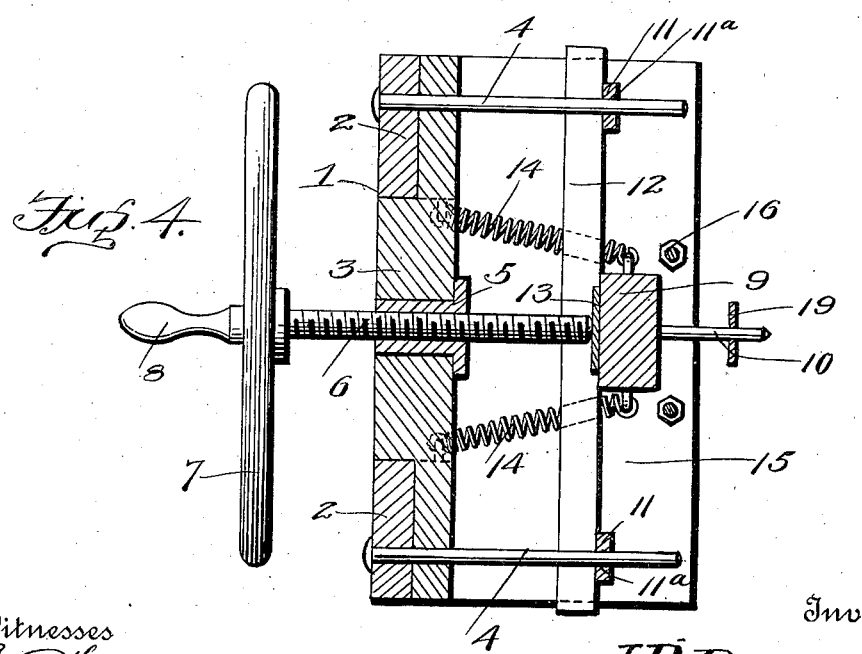

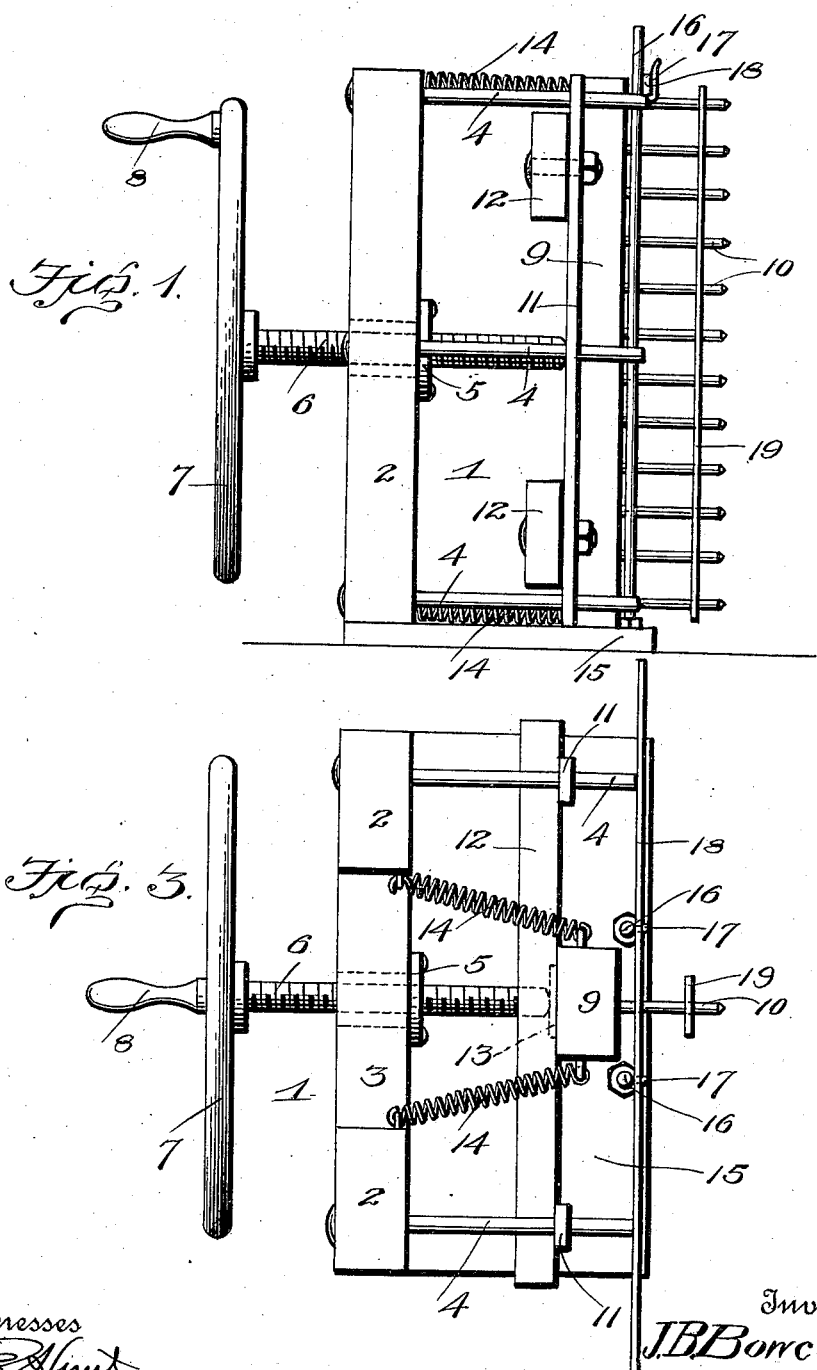

UNITED STATES PATENT OFFICE.

JAMES B. BOWCOCK, OF KIRKSVILLE, MISSOURI.

ICE-CUTTING MACHINE.

1,013,733. Specification of Letters Patent. Patented Jan. 2, 1912.

Application filed August 21, 1911. Serial No. 645,237.

*To all whom it may concern:*

Be it known that I, JAMES B. BOWCOCK, a citizen of the United States, residing at Kirksville, in the county of Adair and State of Missouri, have invented certain new and useful Improvements in Ice-Cutting Machines; and I do declare the following to be a full, clear, and exact description of the invention, such as will enable others skilled in the art to which it appertains to make and use the same.

This invention relates to machines intended for the purpose of severing ice from cakes.

The object of the invention is to provide a portable machine of this character which may be carried from place to place where ice is stored or handled and set up for use without the necessity of skilled labor and without the necessity of rigidly securing the machine in position for use.

It is well known that in ice storage houses, ice boxes and ice wagons, there has been long needed a portable machine of this class which will sever any desired quantity from a cake of ice and thus avoid the necessity of cutting the ice with hand tools, whereby the size of the severed lumps are varied in quantity, and while some consumers receive too much, others receive too little.

It is the object of this invention especially to obviate these difficulties and provide means whereby waste will be eliminated to a very large extent and all consumers will receive the proper amount for which they pay.

With this object in view the invention consists of the improved construction, arrangement and combination of devices hereinafter fully described and afterward specifically claimed.

In the accompanying drawings:—Figure 1 is a side view of my improved ice cutting machine; Fig. 2 is a rear view; Fig. 3 is a top plan view; Fig. 4 is a central horizontal sectional view of the same.

My improved ice cutting machine comprises a plunger supporting frame 1 consisting of a pair of vertically disposed bars or uprights 2 which are connected midway between their ends by a cross bar 3. In the uprights 2 are right angularly projecting guide rods 4, adapted to slidably support a plunger as will be hereinafter more fully described. Arranged in the cross bar 3 is a threaded sleeve or nut 5 with which is operatively engaged a plunger operating screw 6 having on its outer end an operating wheel 7 provided with a crank handle 8.

Slidably mounted between the rods 4 is a vertically disposed plunger bar 9 in the outer face of which is arranged a vertical series of ice engaging and cutting picks 10, which are adapted to be forced into engagement with a cake of ice, thereby cutting from said cake a piece of any suitable size. The plunger 9 is slidably supported on the rods 4 by pairs of vertically disposed bars 11, in which are formed guide passages 11ª with which are engaged the rods 4. The plunger 9 is connected to the bars 11 by upper and lower cross bars 12, said bars being secured to the plunger and to the bars 11 in any suitable manner.

On the inner side of the plunger is arranged a wear plate 13 with which the inner end of the screw 6 is engaged, whereby when the wheel 7 is turned in the proper direction for driving the screw outwardly said plunger and the picks 10 will be forced into engagement with the cake of ice, thus cutting therefrom a piece of the desired size. After the piece of ice has thus been cut from the cake, the wheel is turned to withdraw the screw 6, whereupon the plunger and the picks 10 will be retracted by means of coiled springs 14 which are connected to the plunger and to the bars 2 of the frame as shown. The springs will always hold the plunger 9 in operative engagement with the end of the screw so that no lost motion of the latter is occasioned.

The frame 1 is secured at its lower end to a suitable base or supporting board 15 and the machine is preferably provided with means for ascertaining the quantity of ice to be cut from the cake, said means being here shown and preferably consisting of a pair of upright rods 16 which are arranged at a suitable position on the base board 15 and have secured to their upper ends supporting hooks 17 with which is slidably engaged a yard stick 18 or other scale of measurements which is adapted to be adjusted in said hooks to indicate the width of the piece of ice to be severed from the cake. In arranging the machine for operation, the same is secured to the floor of a wagon or the room in which the machine is to be placed and at a suitable distance from the side of the wagon body or the side of the room or other support to which the machine is secured. After being thus arranged, the cake of ice from which the pieces are to be cut is placed between the machine and the side of the room or wagon body, after which the wheel is turned in the proper direction for forcing the screw forward, thus projecting the plunger and the picks thereon into engagement with the cake of ice and cutting therefrom a piece of the desired size.

By means of my improved ice cutting machine a perfectly square and even cut will be formed and by means of the measuring mechanism herein described the quantity of ice cut from the cake is ascertained. If desired, a bracing and spacing strip 19 may be provided for holding and strengthening the picks 10, said strip being preferably formed of galvanized sheet metal and has formed therein a series of passages spaced at proper distances apart to receive the picks when the strip is engaged therewith, as shown.

From the foregoing description it will be observed that I have produced a machine of compact and handy form which may be readily carried from place to place and applied to its purpose, it being required only that a suitable support exists, upon which to rest the machine, some upright such as the wall of a room being present against which the end of the graduated bar will be placed on which the machine may be moved toward the upright surface and stopped at a proper position to sever the desired quantity of ice from the cake.

I claim as my invention:—

1. An ice cutting machine comprising a base, uprights at the front corners thereof, a horizontal cross bar connecting the uprights at about their mid lengths, a horizontal sleeve secured centrally in the cross bar, horizontal guide rods projecting rearwardly from the uprights, vertical bars slidably mounted on the guide rods, an elongated vertical plunger bar secured to the vertical slidable bars, a horizontal rod in the sleeve and means for propelling the rod endwise against the plunger bar, a series of picks projecting horizontally from the plunger bar, and retracting springs connecting the plunger bar with the corner uprights.

2. An ice cutting machine comprising a frame, horizontal guide rods, vertical bars slidably mounted on the guide rods, horizontal bars secured to the slidable vertical rods, a vertical plunger bar secured to the horizontal bars, a wear plate on the plunger bar, horizontal picks projecting from the plunger bar, a slidable bracing strip on the picks, a rod bearing against the wear plate to propel the plunger bar and picks, means for actuating the rod and retracting springs connecting the plunger bar with the frame.

3. An ice cutting machine comprising a frame, horizontal ice severing means, means for actuating and retracting the ice severing means horizontally, a pair of parallel vertical rods mounted on the frame, supporting means projecting from said parallel rods, and a transverse horizontal positioning rod slidably and removably supported in said supporting means, to indicate the proper position of the horizontal ice severing means.

In testimony whereof I have hereunto set my hand in presence of two subscribing witnesses.

JAMES B. $\overset{\text{his}}{\times}$ BOWCOCK.
mark

Witnesses:
ALLEN D. OSENBAUGH,
JOSEPH C. WEAVER.

---

Copies of this patent may be obtained for five cents each, by addressing the "Commissioner of Patents, Washington, D. C."